May 10, 1966  R. G. THOMPSON  3,250,090
COUPLING
Filed Sept. 28, 1964  2 Sheets-Sheet 1

INVENTOR.
ROBERT G. THOMPSON
BY *M. A. Hobbs*
ATTORNEY

May 10, 1966  R. G. THOMPSON  3,250,090
COUPLING

Filed Sept. 28, 1964  2 Sheets-Sheet 2

INVENTOR.
ROBERT G. THOMPSON
BY *M. A. Hobbs*
ATTORNEY

United States Patent Office 3,250,090
Patented May 10, 1966

3,250,090
COUPLING
Robert G. Thompson, Osceola, Ind., assignor to Dodge Manufacturing Corporation, Mishawaka, Ind., a corporation of Indiana
Filed Sept. 28, 1964, Ser. No. 399,572
2 Claims. (Cl. 64—11)

This is a continuation-in-part of my copending application Serial No. 107,094, filed May 2, 1961, now abandoned.

The present invention relates to couplings and more particularly to a flexible coupling for connecting two rotatable shafts in end to end relation. This application is principally concerned with a coupling having a torsionally flexible element joined integrally with the coupling flanges or other securing members.

One type of flexible coupling extensively used for connecting driver and driven shafts on equipment, such as, for example, a blower and an electric motor of less than one horse-power capacity, consists of opposed flanges for each shaft connected by a flexible rubber element. The flanges and rubber element are usually fabricated separately and connected and retained together as a unit by physically clamping the rubber element to the flanges, or they are assembled individually with the flanges being secured to the opposed shafts and the rubber element loosely disposed between the flanges in interlocking relationship therewith. In both types of small flexible couplings, the flexible element is inherently relatively heavy, bulky and/or complex and is without sufficient torsional flexibility to meet requirements. The geometry of flexible elements of the foregoing type will not tolerate substantial parallel misalignment of the two shafts or angular misalignment and end play without excess wear on the bearings of the two shafts and excess strain on the flexible element. In couplings of the foregoing types, the fixtures for clamping the element to the flanges are frequently intricate, difficult to assemble and adjust, and often cause nonuniform distribution of stresses on the flexible element, resulting in frequent service and replacement of either the element alone or the entire coupling. It is therefore one of the principal objects of the present invention to provide a flexible coupling having opposed flanges connected by and integrally bonded to a flexible element of castable plastic material, having a design capable of giving satisfactory performance on shafts having substantial parallel and angular misalignment and an appreciable amount of end play in the two shafts.

Another object of the invention is to provide a coupling constructed as a complete integral unit ready to be installed on the driver and driven shafts without assembling or adjusting any of the parts thereof, and being of compact, durable and simple construction and design.

Still another object of the invention is to provide a flexible coupling having two opposed flanges of metallic construction bonded directly to a flexible plastic element of substantially larger circumferential size than the two flanges and with an annular internal groove substantially larger than the diameter of the shaft bores in the two flanges.

A further object is to provide a coupling of the aforesaid type having a flexible element and high torsional flexibility and of continuous, homogeneous structure in both the circumferential and axial directions, joined integrally to the two end flanges by casting the material in a fluid state onto the flanges.

Another object of the invention is to provide a flexible element for couplings of the aforesaid type, constructed of castable plastic material, such as polyurethane, bonded directly to the flanges during the casting operation and having a reltaively thin peripheral center section connected to two inwardly extending side walls forming a relatively deep hollow annular interior.

In the use of flexible couplings of the general type disclosed herein, the flanges are placed on the shafts in an end-to-end relation and secured in operating position. With many couplings of this type, it has been necessary to remove the flanges from the shaft or to move them along the shafts, in order to replace worn flexible elements. This is not only time consuming and inconvenient but has often required shifting the driving or driven equipment from its base or mounting to obtain sufficient clearance for removing the flanges, thereby disturbing the machine adjustment and equipment alignment. It is, hence, another object of the invention to provide a coupling of the aforesaid type which is so constructed that the flexible element can readily be mounted on and secured to the flanges and removed therefrom without removing, moving or loosening the flanges, either while mounting the element on or removing it from the flanges. A further object is also to provide a flexible element sub-assembly which is rugged in construction and reliable in operation and which can easily be connected to and disconnected from the flanges while the flanges are held securely in place on the shafts.

Additional objects and advantages of the invention will become apparent from the following description and accompanying drawings, wherein.

Figure 1:
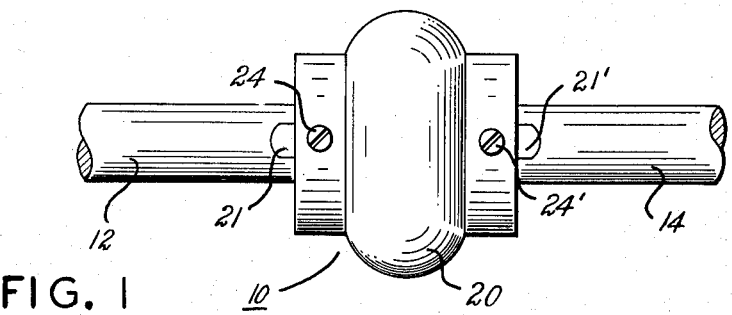
FIGURE 1 is a plan view of the present coupling showing it fully installed on two rotatable shafts in end-to-end relationship.
Figure 3:
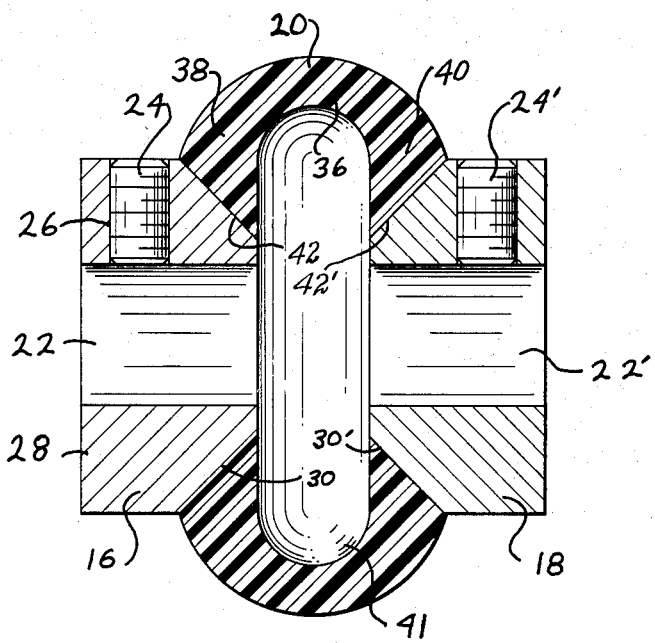
FIGURE 3 is an enlarged longitudinal cross sectional view of the coupling shown in the preceding figures, taken on line 3—3 of FIGURE 2 and showing the coupling with the shaft removed therefrom.
Figure 2:
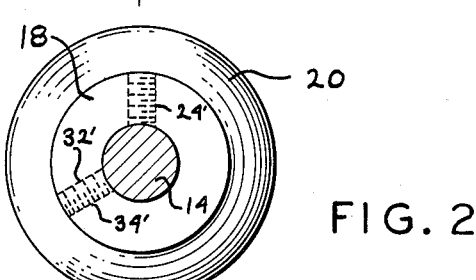
FIGURE 2 is an end elevational view of the coupling and a cross section of one of the shafts shown in FIGURE 1.

With reference to the specific embodiment of the invention shown in the drawings, coupling 10 is shown mounted on driver shaft 12 and driven shaft 14 with coupling flanges 16 and 18 being secured to the respective shafts and connected to one another by a torsionally flexible element 20. The two shafts are in substantial alignment and spaced from one another with driver shaft 12, for example, the shaft of an electric motor, internal combustion engine or similar power source, and driven shaft 14 being the power input or drive shaft of one of a number of different types of machines or devices, such as blowers, pumps or machining equipment. The shafts shown in the drawing are the same diameter and have flats 21 and 21' for receiving the end of a set screw, although the present type of coupling can be readily adapted to driver and driven shafts of different diameters, straight or tapered, and with different types of securing means, including keys and keyways.

The two flanges 16 and 18 are identical in construction and may be used interchangeably on the driver and driven shafts of the same diameter; consequently, only one of the flanges will be described in detail herein, using in the description the same numerals of one with primes to identify like parts of the other. Flange 16 consists of a cylindrical steel body portion having a cylindrical bore 22 extending axially therethrough for receiving either the driver or driven shafts, and a set screw 24 threadedly received in a radial hole 26 in the body and adapted to seat on flat 21 of either shaft after the coupling has been assembled in operating position as shown in FIGURE 1. The external surface of flange 16 is parallel with the axis of the shaft and terminates at the outer end in a surface 28 on a straight radial plane, and at the inner end in a frusto-conical surface 30 extending inwardly to a point spaced from the inner end of bore 22. Surface 30 may be at various angles with respect to the axis of the flange, the one shown being at a forty-five degree angle. As shown in the drawings, two set screws are preferably used in securing each flange to its respective shaft, the second set screw and corresponding threaded hole being designated by numerals 32 and 34.

The flexible element 20 consists of an annular body portion of arcuate cross section with the peripheral center portion 36 being relatively thin and the two marginal portions 38 and 40 being relatively thick and extending inwardly to form a relatively deep internal annular groove 41, and each terminating at its inner edge in a frusto-conical surface 42 and 42' corresponding to frusto-conical surfaces 30 and 30'. The relatively large circumferential size of the element with respect to the size of flanges 16 and 18 and driver and driven shafts, and the cross sectional shape, i.e. relatively thin peripheral portion and thick marginal portions, form the features which give the flexible element its high torsional flexibility and shear strength. The characteristics of this geometry permit it to operate satisfactorily on opposed shafts having a relatively large parallel misalignment as well as appreciable angular misalignment and end play between the two shafts. Variations in this general cross sectional shape of the element may be satisfactorily used in the design of the flexible element. For example, the external transverse configuration of the element may substantially parallel the internal surface to a point on each side approaching the respective flanges and then flare outwardly, preferably curving smoothly into the external surfaces of the flanges. Frusto-conical surfaces 42 and 42' of the flexible element are bonded without the use of any intermediate agent or material to frusto-conical surfaces 30 and 30', respectively, thus eliminating the use of the conventional fixtures, such as screws and clamps, which inherently increase the size, complexity and/or weight of the coupling, fabrication costs and service requirements.

Flexible element 20 is constructed of plastic and a number of different plastic materials may be used satisfactorily in constructing the element, the preferred material being polyurethane having, after setting and curing, a durometer shore "A" scale number preferably within the range of 40 to 100. A hardness of less than 40 results in an element of insufficient strength for most normal operational uses, and a hardness of more than 100 results in an element without sufficient flexibility to perform satisfactorily under most conditions of shaft misalignment. Polyurethane, like a number of other well known and readily available plastic materials, is castable in a fluid state in molds having cavities of the desired shape, and after curing is capable of tenaciously adhering to metal surfaces.

One method of fabricating the present coupling is fully disclosed and claimed in my copending application Serial No. 340,481 filed January 27, 1964, and hence, will not be described in detail herein. In that method each flange is inserted in a separate mold with the frusto-conical surface forming a wall of the mold cavity, and with a core having a shaft extending through bore 22 and of a shape corresponding to one half of groove 41 of the completed element. Liquid polyurethane is then poured into the mold cavity thus formed and permitted to set, thereby forming by casting a circumferential half section of the flexible element with hollow interior or groove 41 being formed by the core. As the plastic material solidifies or sets, it forms a bond with frusto-conical surface 30 with sufficient adhesion to permit the flange and the element half to be removed bodily as a unit from the mold. After the half sections have been removed from the mold, the two sections are placed together in their proper relationship to form the complete coupling, and the plastic material thereafter is fully cured. During the curing step the two cast half sections of the flexible element are combined, with the material forming a single body of continuous, homogeneous structure throughout from one flange to the other and the bond between the flanges and flexible element strengthened to withstand all normal stresses throughout the life of the coupling.

Figures 4, 5:
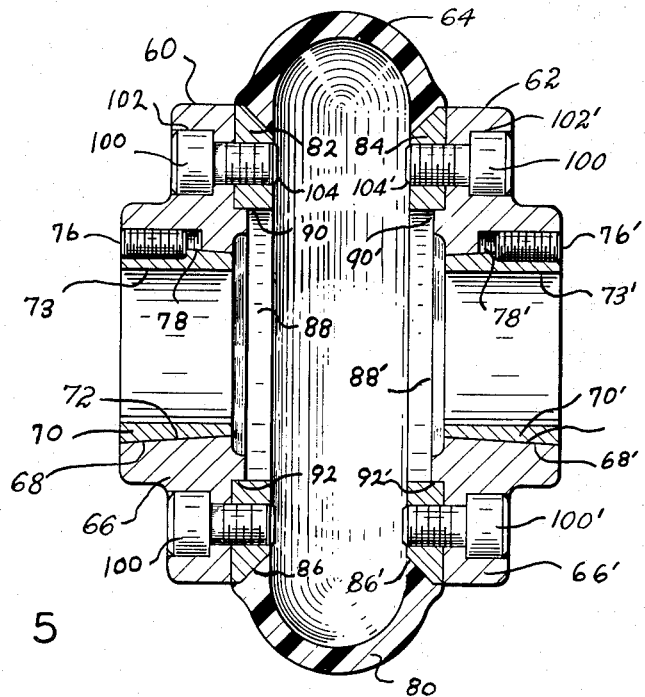
FIGURE 4 is an end elevational view of a coupling embodying a modified form of the present invention.
FIGURE 5 is a vertical cross sectional view of the coupling shown in FIGURE 4, the section being taken on line 5—5 of said figure.

In the modification illustrated in FIGURES 4 and 5, the coupling consists of flanges 60 and 62 adapted to be mounted on shafts arranged in end-to-end relation and to be connected by a flexible torsion element 64. The two flanges are preferably identical in construction, and hence, may be used interchangeably on the driving and driven shafts of the proper diameter; consequently, only one of the flanges will be described in detail herein and like numerals will be used on like parts of the other flange, with primes being used with the numerals thereof.

Flange 60 consists of an annular member 66 having an internal bore with a tapered surface 68 decreasing in diameter from the outer side of the flange to the inner side thereof. Inserted in the bore is a split bushing 70 having an external surface 72 tapered to correspond to the tapered surface 68 on the flange and having an internal annular surface 73 parallel with the shaft and defining a bore substantially the same size as the shaft. The bushing is continuous throughout with the exception of a slot 74 of sufficient width to permit the bushing to contract during installation to grip the shaft firmly, and the tapered surface of the flange and bushing are assembled in face-to-face contact and are adapted to slide relative to one another as the flanges are assembled on and secured to the respective shafts.

Bushing 70 is contracted into firm engagement with the shaft on which the flange is mounted by two screws 76 and 77, the two screws being seated in bores 78. One longitudinal portion of bore 78 is formed in the internal surface 68 of the flange and the other portion is formed in the external surface 72 of bushing 70. The bore portion in the flange is threaded throughout its length and is longer than the bore portion in the bushing so that when screw 76 is threaded into bore 78, the end of the screw abuts against the inner end of the portion in the bushing, thereby forcing the bushing inwardly along tapered surface 68, causing the bushing to contract and firmly engage the shaft. Both screws 76 and 77 are tightened substantially the same amount and, when fully tightened, retain flange 66 firmly in place on the end of the shaft. Flange 66' is secured to the shaft in the same manner by similar screws 76' and 77' in corresponding bores 78'. While the foregoing flange securing means is preferred in attaching the coupling to the axially disposed shafts, other types of securing means may be used if desired.

The flexible torsion element 64 in this embodiment, as in the previously described embodiment of the invention, consists of an annular body portion 80 of plastic material formed by a casting process and joined in the casting process to a pair of metal rings 82 and 84. As the plastic material, such as polyurethane, is cast in a suitable mold of the desired configuration, the two rings which have been inserted in the mold are joined integrally to the newly cast body portion 80, thus forming an integral and firm bond at numeral 86. The two rings 82 and 84 are identical in construction and are provided with a relatively large center hole 88 and 88', respectively, and the internal surface 90 of the rings seats on an outwardly facing external shoulder 92, which assists in holding the rings firmly in place and concentric with the respective flange and assists in centering the flexible element when it is being assembled between the two flanges. After the flexible element has been mounted on the flanges, a plurality of screws 100 and 100' are placed in sockets 102 and 102' and threaded into holes 104 and 104' in the respective rings 82 and 84.

After the screws 100 and 100' have been fully tightened, the two rings form a rigid structure with the respective flanges.

One of the particular advantages of incorporating the two rings 82 and 84 in a coupling of this type is that the two flanges can be mounted separately on the respective shafts and the sub-assembly consisting of flexible body portion 80 and the two rings 82 and 84 joined integrally therewith, can be mounted between the two flanges without moving or adjusting the flanges. Likewise, in replacing worn flexible element 64, the sub-assembly consisting of the flexible portion and the two rings can easily be slipped from between the flanges after screws 100 and 100' have been removed, thereby releasing the rings. Another important advantage in the use of rings 82 and 84 is that in the casting operation the metal to which the plastic material is bonded must be heated to a predetermined critical temperature and the rings permit this temperature to be readily reached and maintained until the molding operation has been completed and assembled. Likewise, in replacing the worn element 64, only the rings and the worn flexible portion are removed from the coupling assembly, and while the rings may be prepared for further use in forming new flexible element sub-assemblies, they may be discarded with little expense if desired.

While this modified form may be made by various means, including the method previously described herein, it lends itself more readily to a casting operation in which both halves are formed simultaneously in a single operation, using a core, such as a destructible sand core in combination with a permanent metal mold. In performing this method, the two metal rings 82 and 84 are inserted in the mold along with the destructible core and while the rings are maintained at a predetermined elevated temperature, the plastic material is poured into the mold cavity where it contacts the prepared surfaces on the outer and/or peripheral edges of the two rings, thereby bonding itself at its inner edges to the rings. After the assembly, consisting of flexible portion 80 and rings 82 and 84, has been removed from the mold, the destructible core is removed by any suitable method, leaving the arcuately shaped portion attached firmly to rings 82 and 84.

While two embodiments of the present novel coupling and one method of producing the coupling are disclosed in detail herein, various changes in the details of the coupling, including the use of a variety of materials such as aluminum and brass for flanges 16 and 18 in place of steel, may be made without departing from the scope of the invention. Further, annular surfaces 30 and 30' of the flanges and corresponding surfaces 42 and 42' of the element may be of different configurations than the frusto-conical surface shown, i.e. the annular surfaces may be of curved design or at more than one angle.

I claim:

1. A flexible coupling for connecting two shafts in end-to-end relation, comprising flanges for said shafts, each of said flanges having a split bushing with an internal annular surface generally parallel with the axis of the shafts and an external surface tapered from the inside end to the outside end, said flanges having a bore for receiving said bushings and having an inner surface tapered to correspond to the tapered external surface of said bushings for face to face contact therewith, bores intersecting the tapered surfaces and having threads in the portion in said flanges and an abutment in the portion in said bushings, each of said flanges having an annular shoulder on its internal face, a ring for each of said flanges seating on said annular shoulder, a flexible element of arcuate cross section and with inwardly extending side walls bonded integrally at their inner edges to the periphery of the respective ring, and screws extending through said flanges securing said rings to the respective flange.

2. A flexible coupling for connecting two shafts in end-to-end relation, comprising flanges for said shafts, each of said flanges having an annular shoulder on its internal face, means for securing said flanges to said shafts, a ring for each of said flanges seating on said annular shoulder, a flexible element of arcuate cross section and with inwardly extending side walls bonded integrally at their inner edges to the periphery of the respective ring, and screws extending through said flanges securing said rings to the respective flange.

References Cited by the Examiner

UNITED STATES PATENTS

| 1,501,187 | 7/1924 | Rayfield | 64—11 |
| 1,790,516 | 1/1931 | Williams | 64—11 |
| 2,295,316 | 9/1942 | Yates | 64—11 |
| 2,747,386 | 5/1956 | Ayling | 64—11 |
| 2,945,365 | 7/1960 | Ulderup et al. | 64—11 |

FOREIGN PATENTS

| 1,248,272 | 10/1960 | France. |
| 710,166 | 9/1941 | Germany. |
| 710,442 | 9/1941 | Germany. |
| 586,599 | 3/1947 | Great Britain. |

BROUGHTON G. DURHAM, *Primary Examiner.*

ROBERT C. RIORDON, *Examiner.*

H. C. COE, *Assistant Examiner.*